United States Patent [19]

Patel et al.

[11] Patent Number: 5,153,011
[45] Date of Patent: Oct. 6, 1992

[54] CHEWING GUM FLAVOR INGREDIENT

[75] Inventors: Mansukh M. Patel, Downers Grove; Jayant C. Dave, Bloomingdale, both of Ill.; Kevin F. Barrett, Ballwin, Mo.; Philip G. Schnell, Downers Grove, Ill.

[73] Assignee: Wm. Wrigley Jr. Company, Chicago, Ill.

[21] Appl. No.: 746,768

[22] Filed: Aug. 16, 1991

[51] Int. Cl.⁵ ............................................. A23G 3/30
[52] U.S. Cl. ...................................... 426/5; 426/96; 426/99; 426/534; 426/651
[58] Field of Search ...................... 426/3-6, 426/96, 99, 534, 453, 650, 651, 302, 306, 307, 310

[56] References Cited

U.S. PATENT DOCUMENTS

| | | | |
|---|---|---|---|
| 2,886,449 | 5/1959 | Rosenthal et al. | 99/135 |
| 3,069,370 | 12/1962 | Jensen et al. | 260/23 |
| 4,473,620 | 9/1984 | Wu et al. | 426/96 |
| 4,673,577 | 6/1987 | Patel | 426/5 |
| 4,911,934 | 3/1990 | Yang | 426/96 |
| 4,963,369 | 10/1990 | Song et al. | 426/96 |
| 4,983,404 | 1/1991 | Raman et al. | 426/3 |
| 4,996,067 | 2/1991 | Kobayashi et al. | 426/96 |

FOREIGN PATENT DOCUMENTS

| | | | |
|---|---|---|---|
| 9011020 | 10/1990 | World Int. Prop. O. | 426/5 |
| 9013994 | 11/1990 | World Int. Prop. O. | 426/5 |

OTHER PUBLICATIONS

"Food Chemicals Codex", Third Edition, National Acadamy Press, Washington, D.C. (1981), preface and pp. 41-43.

National Starches, Food Division, National Starch & Chemical Corp., Bulletin No. 447, "N-Lok", 1980 (2-page brochure).

National Starch & Chemical Corp., Food Products Division, Technical Service Bulletin, "N-Lok", 1988 (1-page brochure).

*Primary Examiner*—Jeanette Hunter
*Attorney, Agent, or Firm*—Willian, Brinks, Olds, Hofer, Gilson & Lione

[57] ABSTRACT

A flavor ingredient has been found to provide long lasting, high intensity and high quality flavor when used in chewing gum compositions. The flavor ingredient contains between 7-30% by weight of a flavoring agent such as mint oil, between 2-15% by weight styrene butadiene rubber, between 45-90% by weight starch or modified starch, between 0-8% by weight water and, preferably, between 0.5-4% by weight of a thickener such as silicon dioxide. The flavor ingredient is prepared by mixing the flavoring agent with particles of the elastomer to form a suspension. The suspension is then mixed with an aqueous starch solution and the thickener is added. The resulting stable emulsion is dried to form the flavor ingredient of the invention.

38 Claims, No Drawings

CHEWING GUM FLAVOR INGREDIENT

FIELD OF THE INVENTION

This invention relates to a flavor ingredient for a chewing gum base which causes the chewing gum to have increased flavor intensity, unique flavor characteristics and increased flavor duration. This invention also relates to a method of preparing the flavor ingredient.

BACKGROUND OF THE INVENTION

Chewing gums of the types typically known in the art contain many ingredients including flavor ingredients. It is often desirable to produce a chewing gum having a high degree of sweetness and flavor. However, one of the limitations of chewing gum is that the sweetness and flavor are rapidly lost during chewing. This is especially true of "fast-release" chewing gums which release their sweetness and flavor compounds rapidly, creating an initial burst of high intensity sweetness and flavor which is initially pleasing to the consumer but which dissipates quickly during chewing.

"Slow-release" chewing gums, on the other hand, release their sweetness and flavor over a longer period of time but do not provide an initial burst of high intensity sweetness and flavor. Thus, the consumer who desires an initial sweetness and flavor impact must sacrifice the enjoyment of long lasting sweetness and flavor. The consumer who desires a chewing gum having a longer lasting sweetness and flavor must forego the enjoyment of an initial sweetness and flavor impact. Chewing gum manufacturers are constantly trying to extend the time in which consumers can enjoy the sweetness and flavor of chewing gum without sacrificing the quality of the initial sweetness and flavor impact.

In order to control the release of the flavoring agents, and thus lengthen the duration of the flavor, various methods and systems for encapsulating flavoring agents in matrices have been developed and are known in the art. U.S. Pat. No. 2,290,120, issued to Thomas, discloses the mixing of particles of chewing gum base with the flavoring agent to provide a substantially homogeneous mixture. U.S. Pat. No. 2,596,852, issued to Heggie, discloses chemically reacting the chewing gum base with molecules of flavor ingredient, wherein the chewing gum base is a vinyl acetate polymer and the flavor molecule contains an ethylenic bond.

U.S. Pat. No. 2,886,446, issued to Kramer, discloses the coacervation of a typically volatile, water immiscible flavoring oil within a body of gelatin. U.S. Pat. No. 3,085,048, issued to Bush, discloses a process for coating dicalcium phosphate with sugar. U.S. Pat. No. 3,795,744, issued to Ogawa et. al., discloses the coating, encapsulation or combination of flavoring agents with high molecular weight compounds including starches, cellulose, proteins, gums, polyvinyl alcohol and polyvinyl esters. U.S. Pat. No. 3,826,847, issued to Ogawa et. al., contains a similar disclosure. U.S. Pat. No. 3,818,107, issued to Yolles, discloses flavoring agent appended to a polymer backbone, releasable upon hydrolysis.

U.S. Pat. No. 3,962,463, issued to Witzel, discloses the encapsulation of flavor ingredients in gelatin waxes, polyethylene and the like followed by the depositing of the encapsulated flavor particles on the surface of the chewing gum. U.S. Pat. No. 4,217,368, issued to Witzel et. al., discloses the controlled release of a (second) sweetener which is dispersed in, enveloped by, trapped in and otherwise protected by the gum base. A first sweetener, which is relatively unprotected, provides an initial burst of flavor. U.S. Pat. No. 4,259,355, issued to Marmo et. al., discloses a hydrolytically releasable flavor oil entrapped in gelatine, dextrin, gum acacia or modified food starch with the aid of a hydroxypropylcellulose solid suspending agent. A hydrophobic unconfined flavor oil provides an initial burst of flavor.

U.S. Pat. No. 4,230,687, issued to Sair et. al., discloses the encapsulation of flavoring agent in a polymeric medium using rigorous and intimate conditions of mechanical shear to mix the flavoring agent with the encapsulating medium. The flavoring agent is gradually released from the encapsulating matrix at a rate dependent upon the rate of hydration of the matrix, which in turn depends upon the particular matrix used. The polymeric matrix may be derived from natural substances such as casein, a gelatin, modified starches, gums and related materials.

U.S. Pat. No. 4,590,075, issued to Wei et. al., discloses a flavor and sweetener delivery system including a flavoring agent and/or sweetener encapsulated in an elastomeric matrix. The elastomeric matrix is substantially hydrophobic and includes elastomer, elastomer solvent, a wax system and an excipient. The excipient, which is present only in small amounts, can include carbohydrate materials (including partially hydrolyzed starch), polyhydric alcohols and mixtures of carbohydrates and polyhydric alcohols.

By slowing the release of the flavoring agent, the encapsulating methods and systems of the prior art typically also reduce the intensity of the encapsulated flavor. Therefore, as discussed above, a separate and unconfined source of flavor is often necessary in order to prevent loss of the desirable initial burst of flavor. The approaches to flavor modification discussed above generally fall short of providing a single flavor ingredient which simultaneously causes flavor of increased intensity and increased duration.

SUMMARY OF THE INVENTION

In accordance with the present invention, a flavor ingredient has been developed which, when used in chewing gum, causes a surprising and unexpected improvement in both the intensity and duration of the flavor and yields a high quality flavor as well. Also in accordance with the present invention, a method has been developed for making the flavor ingredient of the invention.

The flavor ingredient of the invention is typically in the form of a white powder but may also exist in other solid forms, or in solution, depending in part on whether the flavor ingredient of the invention has been mixed with other chewing gum ingredients. When in its solid state, the flavor ingredient of the invention includes about 7-30% by weight of a flavoring agent such as mint oil, about 2-15% by weight of a styrene butadiene rubber (SBR), about 45-90% by weight modified starch, about 0.5-4.0% by weight silicon dioxide and about 0-8% water. When added to a standard chewing gum formula, this ingredient gives increased flavor intensity and duration compared with a similar chewing gum formula in which the flavoring agent is used alone.

The flavor ingredient of the invention can be prepared by initially grinding the styrene butadiene rubber into small particles. The styrene butadiene rubber is then blended or soaked with a flavoring agent (for example, mint oil) to form a flavor/gel in which the small particles of styrene butadiene rubber are suspended in the flavoring agent in a substantially homogeneous fashion. The flavor/gel suspension is then mixed with an aqueous starch solution using a high speed blender. About halfway through the blending, silicon dioxide is added to the mix to thicken and stabilize the solution. The mixture of flavor/gel and starch solution and silicon dioxide is homogenized to a stable emulsion. The stable emulsion is then dried, preferably spray dried, yielding a white fluffy powder which constitutes the flavor ingredient of the invention.

With the foregoing in mind, it is a feature and advantage of the invention to provide a flavor ingredient for use in chewing gum which imparts a high quality, high intensity and long lasting flavor to the chewing gum.

It is also a feature and advantage of the invention to provide a method of making a flavor ingredient, for use in chewing gum, which imparts a high quality, high intensity and long lasting flavor to the chewing gum.

It is also a feature and advantage of the invention to provide a chewing gum composition having a high quality, high intensity and long lasting flavor.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

While the invention can be used to prolong and enhance the flavor of flavoring agents in general, the invention has been found to be particularly effective when the flavoring agent is a mint oil. The term "mint oil" includes, but is not limited to, peppermint oil, spearmint oil, corn mint oil, Scotch spearmint oil and mixtures thereof. Other flavoring agents may include, but are not necessarily limited to, oils derived from plants and fruits such as citrus oils, fruit essences, clove oil, oil of wintergreen, anise and the like. Artificial flavoring agents may also be used either alone or in combination with natural flavoring agents.

In a presently preferred embodiment, the flavor ingredient of the invention is prepared by first preparing a styrene butadiene rubber, which can typically be purchased in two foot square slabs, into small pieces having average diameters in the range of about 0.25 inch to about 1 inch. The preferred styrene butadiene elastomers are characterized as having polymer viscosities at 100° C. averaging between 40-80 centipoise, and containing between 20 and 60 weight per cent bound styrene. Most preferably, the styrene butadiene elastomer will have an average polymer viscosity at 100° C. of between 52-64 centipoise, and will contain between 45 and 50 weight per cent bound styrene.

SBR has been approved by the Food and Drug Administration both in ratios of 75% butadiene/25% styrene and 50% butadiene/50% styrene. Of these, a particularly suitable SBR elastomer is known as Plioflex 1028, manufactured by Goodyear Chemicals. Plioflex 1028 has an average polymer viscosity at 100° C. of 52-64 cp. and contains 45-50 weight per cent bound styrene.

The SBR elastomer is mixed with the flavoring agent to form a flavor/gel suspension containing between 10-60% by weight styrene butadiene rubber and between 40-90% by weight flavoring agent, in which the small particles of SBR are suspended in the flavoring agent. More preferably, between 25-45% by weight styrene butadiene rubber is mixed with between 55-75% by weight flavoring agent. In a highly preferred embodiment, about 33 weight per cent styrene butadiene rubber is mixed with about 67 weight per cent flavoring agent. The mixing can be accomplished at room temperature, using a Sigma mixer to minimize lumps and ensure homogeneity. The flavoring agent is preferably added slowly over a 30-minute period. Preferably, the total mix time is about one hour. The components may also be blended by soaking the SBR with a flavoring agent, preferably for a 24-hour period.

The flavor/gel suspension is then mixed with an aqueous starch solution in a high speed blender, such as a Waring blender, to form a mixture containing between 10-55% by weight flavor/gel and 45-90% by weight starch, exclusive of the water. More preferably, the mixture will contain between 20-45% by weight flavor/gel and between 55-80% by weight starch, excluding the water.

The term "starch" is defined herein to encompass any commonly known starch, starch mixture or modified starch. A modified starch may, for example, contain a maltodextrin, corn syrup solids, gum arabic, cellulose or other substance that is used for spray drying. Preferably, the starch solution will contain between 20-50% dry solids and between 50-80% water. A commercially available modified starch which is particularly suitable for use in the invention is N-Lok, manufactured by National Starch and Chemical Co. This is a product developed for spray drying that contains starch and corn syrup solids. For purposes of the invention, the N-Lok should be first mixed with water to form a solution containing between 30-40 weight per cent total dry solids and 60-70 weight per cent water. Other commercially available starches can also be used.

An antifoam agent may also be added, if necessary, to minimize foaming of the modified starch solution during blending. A suitable antifoam agent is FG 10 antifoam emulsion, manufactured by Dow Corning Co. Other antifoam agents may also be suitable. After the starch has been mixed with the flavor/gel, silicon dioxide can be added to thicken and stabilize the mixture. Preferably, between 0.05-4.0 parts by weight silicon dioxide are added per 100 parts by weight flavor/gel and starch, exclusive of the water. The silicon dioxide can be a fused silica such as Cabosil EH5 available from Cabot and Co., or Aerosil 300 available from Degussa.

In a highly preferred embodiment, about 450 parts by weight of the flavor/gel suspension is added to about 3000 parts by weight of a 35% N-Lok starch solution and the components are blended for about one minute using a Waring blender. If an antifoam agent is used, about 5 parts by weight antifoam is added per 3000 parts by weight of N-Lok starch solution. Then, silicon dioxide is added to the mixture in an amount of about 35 parts by weight silicon dioxide per 3,000 parts by weight of the N-Lok starch solution, and the components are blended for about another minute.

After the components have been blended, preferably using the Waring blender, the mixture is homogenized to a stable emulsion. This homogenization can be accomplished using a Brinkman homogenizer with Model No. BAA45 attachment. The homogenization process requires about one minute. During mixing and homogenization, the temperature of the resulting emulsion increases from room temperature (about 75° F.) to about 110°-120° F.

The stable emulsion can be spray dried, preferably using nozzle atomization with an inlet air temperature of about 200° C. (about 390° F.) and an outlet temperature of about 75°-90° C. (about 167-195° F.). The preferred equipment used for spray drying is the Niro Atomizer made by Niro Corp.

The final product is a white fluffy powder that most preferably contains about 17.3 weight per cent flavoring agent, about 8.6 weight per cent styrene butadiene rubber, about 68 weight per cent modified starch, about 2 weight per cent silicon dioxide and about four weight per cent water. While the percentages may vary somewhat depending on the type of the flavoring agent and other factors, the flavor ingredient of the invention will generally contain between 7-30% flavoring agent, between 2-15% SBR elastomer, between 45-90% modified starch, between 0.5-4% silicon dioxide and between 0-8% water. More preferably, the flavor ingredient of the invention contains between 12-25% flavoring agent, between 5-12% styrene butadiene elastomer, between 55-80% modified starch, between 1-3% silicon dioxide and between 2-6% water.

The flavor ingredient of the invention can be added to any chewing gum formula to give high intensity, high quality, long lasting flavor. In addition to flavoring agents, a chewing gum composition generally includes a water soluble bulk portion and a water insoluble chewing gum base portion. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

The flavor ingredient of the invention should generally be present in the chewing gum in an amount within the range of about 0.1-15% by weight of the chewing gum, preferably between about 0.2-5% by weight of the chewing gum, most preferably between about 0.5-3% by weight of the chewing gum. As previously indicated, flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. The flavor ingredient of the invention, and optional additional flavoring agents, are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

A 33.3 gram quantity of SBR was cut into small pieces having average diameters of about 0.25 inch. The SBR was soaked overnight in 66.6 grams natural spearmint flavor. This resulted in a thick, gelatinous material with no separation of SBR and spearmint flavor.

The resulting flavor/SBR gelatinous material was blended into a chewing gum formula having the composition listed below for Sample B. A control chewing gum sample containing untreated spearmint flavor, was prepared according to the composition listed below for Sample A.

| Ingredient | A (% by weight) | B (% by weight) |
| --- | --- | --- |
| Sugar | 50.73 | 50.73 |
| Corn Syrup | 16.88 | 16.88 |
| Glycerin | 0.93 | 0.93 |
| Dextrose Monohydrate | 10.16 | 10.16 |
| Color | 0.06 | 0.06 |
| Gum Base | 20.68 | 20.40 |
| Spearmint Flavor | 0.56 | — |
| Flavor/SBR Gelatinous Material | — | 0.84 |
| TOTAL | 100.00 | 100.00 |

Sample B was compared sensorially to Sample A, by three expert sensory panelists. It was determined that Sample B had increased flavor intensity and increased flavor duration compared to Sample A.

EXAMPLE 2

A 39 gram quantity of SBR elastomer was cut into small pieces having an average diameter of about one quarter inch. The SBR was soaked overnight in 78 grams of natural spearmint flavor. This resulted in a thick gelatinous material with no separation of SBR rubber and flavor.

A 35% solution of modified starch (N-Lok) was prepared by mixing 87.5 grams of N-Lok with 162.5 grams of water. This solution was mixed with the gelatinous SBR/flavor from above in a Waring Blender for one minute. To this was added 6 grams of silicon dioxide (Cabosil EH5) and mixed another minute in the Waring Blender. Another 250 grams of the 35% N-Lok solution was added to the Waring Blender and mixed. This material was then homogenized with a Brinkman Homogenizer with Model No. PTA 45/6 attachment. This mixture was ready for spray drying.

EXAMPLE 3

A 106 gram quantity of SBR elastomer cut into small pieces as in Example 2 was soaked overnight in 212 grams of natural spearmint flavor giving the thick gelatinous material. To this was added 297 grams of the 35% N-Lok solution and mixed in the Waring Blender. Another 396 grams of the 35% N-Lok solution was added and further mixed for one minute. Then a 17 gram quantity of Cabosil EH5 was added and blended in the Waring Blender. Another 692 grams of a 35% N-Lok solution was added and blended another one minute. Using the Brinkman Homogenizer, the final mixture was made by homogenizing for about 30 sec. This mixture was ready for spray drying.

EXAMPLE 4

Spray Drying

The samples obtained in Example 2 and Example 3 were blended together for spray drying. The mixture temperature had increased from about 75° F. to 101° F. due to blending and homogenizing. As the mixture was fed through the feed line to the spray dryer, the line passed through a 56° C. water bath to raise the feed temperature to 117° F. Other spray drying parameters were:

Air temperature in—180° C.
Outlet temperature—82-93° C.
Feed rate—2.1-2.3 setting (200-230 ml/min)
Atomizing psig—58

Of the total material of Example 2 and 3, 2137 grams of material containing 47.8% dry solids was spray dried. Of the dry solids 80% recovery was obtained.

This powdered mixture of flavor ingredient was used to prepare gum as shown in Example 5.

EXAMPLE 5

The flavor ingredient produced according to the procedure in Example 4 was added to a chewing gum formula which also contained untreated spearmint flavor, according to the composition listed below for Sample D. A control chewing gum sample containing untreated spearmint flavor but not containing the flavor ingredient of the invention, was prepared according to the composition listed below for Sample C.

| Ingredient | C (% by weight) | D (% by weight) |
| --- | --- | --- |
| Sugar | 53.15 | 52.804 |
| Corn Syrup | 14.57 | 14.57 |
| Glycerin | 0.94 | 0.94 |
| Dextrose Monohydrate | 10.13 | 10.13 |
| Gum Base | 20.65 | 20.65 |
| Spearmint Flavor | 0.56 | 0.56 |
| Spray Dried Flavor Ingredient | — | 0.346 |
| TOTAL | 100.00 | 100.00 |

Sample D was compared sensorially to Sample C by a 3-member expert panel. Results indicated that Sample D had increased flavor intensity and increased flavor duration compared to Sample C. Although the intensity was increased by the inclusion of 0.07% additional flavor, the flavor had longer duration than expected. It can be seen from the foregoing test results that the flavor ingredient of the invention can also be used effectively as a flavor enhancer when added with an untreated flavoring agent.

While the embodiments of the invention disclosed herein are at present considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A method of preparing a flavor ingredient, comprising the steps of:
    mixing particles of styrene butadiene elastomer and flavoring agent to form a flavor/gel mixture consisting essentially of between 10-60% by weight styrene butadiene elastomer and between 40-90% by weight flavoring agent;
    mixing the flavor/gel mixture with an aqueous starch solution to form a second mixture comprising between 10-50% by weight flavor/gel and 45-90% by weight starch, exclusive of the water;
    homogenizing the second mixture to form an emulsion; and
    drying the emulsion to form the flavor ingredient.

2. The method of claim 1 wherein the drying is accomplished by spray drying the emulsion to form the flavor ingredient.

3. The method of claim 1 further comprising the step of adding silicon dioxide to the second mixture in an amount of between 0.05-4 parts by weight silicon dioxide per 100 parts be weight flavor/gel and starch, exclusive of the water.

4. The method of claim 1 further comprising the step of preparing styrene butadiene elastomer to form particles having an average diameter of between 0.25 inch and 1 inch, prior to mixing the particles with a flavoring agent.

5. The method of claim 1 wherein the styrene butadiene eastomer and flavoring agent are mixed to form a flavor/gel mixture comprising between 25-45% by weight styrene butadiene elastomer and between 55-75% by weight flavoring agent.

6. The method of claim 5 wherein the styrene butadiene elastomer and flavoring agent are mixed to form a flavor/gel mixture comprising about 33% by weight styrene butadiene rubber and about 67% by weight flavoring agent.

7. The method of claim 1 wherein the styrene butadiene elastomer has a viscosity at 100° C. averaging between 40-80 centipoise.

8. The method of claim 7 wherein the styrene butadiene elastomer has a viscosity at 100° C. averaging between 52-64 centipoise.

9. The method of claim 1 wherein the styrene butadiene elastomer comprises between 20 and 60 weight per cent bound styrene.

10. The method of claim 9 wherein the styrene butadiene elastomer comprises between 45 and 50 weight per cent bound styrene.

11. The method of claim 1 wherein the flavoring agent comprises a mint oil selected from the group consisting of peppermint oil, spearmint oil, corn mint oil, Scotch spearmint oil and mixtures thereof.

12. The method of claim 1 wherein the flavor/gel mixture is mixed with an aqueous starch solution to form a second mixture comprising between 20-45% by weight flavor/gel and between 55-80% by weight starch, exclusive of the water.

13. The method of claim 1 wherein the starch comprises modified starch.

14. The method of claim 1 wherein the aqueous starch solution comprises between 20-50% by weight solids and between 50-80% by weight water.

15. The method of claim 14 wherein the aqueous starch solution comprises between 30-40% by weight solids and between 60-70% by weight water.

16. A flavor ingredient produced according to the method of claim 1.

17. A chewing gum composition comprising a flavor ingredient produced according to the method of claim 1.

18. A method of preparing a flavor ingredient for use in a chewing gum composition, comprising the steps of:
    mixing between 10-60% by weight of a particulated styrene butadiene elastomer with between 40-90% by weight of a flavoring agent to form a first mixture;
    mixing the first mixture with a modified starch solution comprising between 20-50% by weight modified starch and between 50-80% by weight water to form a second mixture, the second mixture comprising between 10-55% by weight of the first mixture and between 45-90% by weight modified starch, excluding the water;
    stabilizing and homogenizing the second mixture to form a stable emulsion; and
    drying the stable emulsion to form the flavor ingredient.

19. The method of claim 18 wherein the flavoring agent comprises spearmint oil.

20. A flavor ingredient produced according to the method of claim 18.

21. A chewing gum composition comprising a water soluble bulk portion, a water insoluble base portion and a flavor ingredient produced according to the method of claim 18.

22. A chewing gum flavor ingredient, comprising:
    about 7-30% by weight of a flavoring agent;
    about 2-15% by weight styrene butadiene rubber;
    about 45-90% by weight modified starch;
    about 0-8% by weight water; and
    about 0.5-4% by weight of a thickener.

23. The flavor ingredient of claim 22 wherein the thickener comprises silicon dioxide.

24. The flavor ingredient of claim 22 wherein the flavoring agent comprises mint oil.

25. The flavor ingredient of claim 22 comprising between 12-25% by weight of the flavoring agent.

26. The flavor ingredient of claim 25 comprising about 17% by weight of the flavoring agent.

27. The flavor ingredient of claim 22 wherein the styrene butadiene rubber has an average viscosity at 100° C. of between 40-80 centipoise.

28. The flavor ingredient of claim 27 wherein the styrene butadiene rubber has an average viscosity at 100° C. of between 52-64 centipoise.

29. The flavor ingredient of claim 22 wherein the styrene butadiene rubber comprises between 20 and 60 weight per cent bound styrene.

30. The flavor ingredient of claim 29 wherein the styrene butadiene rubber comprises between 45 and 50 weight per cent bound styrene.

31. The flavor ingredient of claim 22 comprising between 55-80% by weight modified starch.

32. The flavor ingredient of claim 22 comprising about 68% by weight modified starch.

33. The flavor ingredient of claim 22 comprising between 2-6% by weight water.

34. The flavor ingredient of claim 22 comprising between 1-3% by weight of the thickener.

35. The flavor ingredient of claim 34 comprising about 2% by weight of the thickner.

36. A chewing gum composition comprising a water soluble bulk portion, a water insoluble chewing gum base and between 0.1 and 15 weight per cent of a flavor ingredient which contains between 7-30% by weight of a flavoring agent, between 2-15% by weight styrene butadiene rubber, between 45-90% by weight starch, between 0-8% by weight water and between 0.5-4% by weight of a thickener.

37. The chewing gum composition of claim 36 wherein the flavoring agent comprises spearmint oil.

38. A chewing gum composition comprising a water soluble bulk portion, a water insoluble chewing gum base and a flavor ingredient which comprises about 12-25% by weight of a flavoring agent, about 5-12% by weight styrene butadiene rubber, about 55-80% by weight starch and about 1-3 per cent by weight thickener.

* * * * *